(12) United States Patent
Samaniego et al.

(10) Patent No.: US 8,746,234 B2
(45) Date of Patent: Jun. 10, 2014

(54) ASSEMBLY AND METHOD FOR SOLAR HEATING TUBE(S)

(75) Inventors: Jerrold H. Samaniego, Tucson, AZ (US); Jerry Michael Samaniego, Tucson, AZ (US)

(73) Assignee: SolarTech International, LLC, Tucson, AZ (US)

( * ) Notice: Subject to any disclaimer, the term of this patent is extended or adjusted under 35 U.S.C. 154(b) by 44 days.

(21) Appl. No.: 13/339,016

(22) Filed: Dec. 28, 2011

(65) Prior Publication Data

US 2012/0192513 A1 Aug. 2, 2012

Related U.S. Application Data

(60) Provisional application No. 61/460,331, filed on Dec. 30, 2010.

(51) Int. Cl.
*F24J 2/24* (2006.01)
(52) U.S. Cl.
USPC .......... 126/624; 126/623; 126/651; 52/173.3; 52/745.19

(58) Field of Classification Search
USPC ............ 126/624, 623, 651; 52/173.3, 745.19; 248/68.1, 90
See application file for complete search history.

(56) References Cited

U.S. PATENT DOCUMENTS 2,543,997 A * 3/1951 Vavra et al. .................. 248/68.1
4,014,314 A * 3/1977 Newton ........................ 126/626

* cited by examiner

*Primary Examiner* — Alfred Basichas

(57) ABSTRACT

A tube structure, and a method for assembling the tube structure, is provided, that is particularly useful in a solar heating system. The tube structure comprises, (a) a tube formed into a predetermined (e.g. coiled) configuration, (b) at least one rafter which engages the tube in a manner designed to hold the tube in the predetermined configuration, and (c) a plurality of snippets connected at predetermined locations to the rafter, the snippets extending away from a bottom surface of the rafter, and configured to (i) hold the rafter away from the substrate to allow flow of water and debris along the substrate without interference from the rafter, and (ii) allow relative movement of the rafter and tube relative to the snippets during expansion and contraction of the tube structure.

4 Claims, 6 Drawing Sheets

ASSEMBLY AND METHOD FOR SOLAR HEATING TUBE(S)

RELATED APPLICATION/CLAIM OF PRIORITY

This application is related to and claims priority from provisional application Ser. No. 61/460,331, filed Dec. 30, 2010, which provisional application is incorporated by reference herein.

INTRODUCTION AND SUMMARY OF THE PRESENT INVENTION

The present invention provides a structure and method of assembling a tube structure for application to a substrate, which is particularly useful in a solar heating system where a coiled tube is supported on the roof of a building structure.

In a solar heating structure, e.g. for heating the water of a swimming pool, it is known to support one or more coiled solar heating tubes on the roof of a structure, to flow water from the swimming pool through the tube(s). The tube(s) are formed of vacuum extruded polyethylene which absorbs heat from exposure to sunlight. As the tubes heat from exposure to sunlight, the tubes transfer heat to the water that is then circulated back to the pool. In such a structure, it is known to use rafters (which are effectively. Braces or brackets) to support the tube(s) in a predetermined (e.g. coiled) configuration, with the bottoms of the rafters lying against the building roof, and supporting the tube coil above the surface of the roof.

The present invention provides both a tube structure (e.g. for a solar heating structure), and a method of assembling the tube structure for application to a substrate, which further improves the manner in which the tube structure is supported from the structure. The structure and method of the present invention is particularly useful in assembling a tube structure that can be used, e.g. in a solar heating system.

The improved tube structure of the invention comprises, (a) a tube formed into a predetermined (e.g. coiled) configuration, (b) at least one rafter at a predetermined location relative to the tube, which engages the tube in a manner designed to hold the tube in the predetermined configuration, where the rafter having upper portions that engage the tube and bottom portions that are configured to face the surface of a substrate to which the tube structure is applied, and (c) a plurality of snippets connected at predetermined locations to the rafter, the snippets extending away from the bottom surface of the rafter, and configured to (i) hold the rafter away from the substrate surface in a manner that allows flow of water and debris along the substrate without interference from the rafter, and (ii) allow relative movement of the rafter and tube relative to the snippets during expansion and contraction of the tube structure due to temperature variations to which the tube structure is subjected.

Preferably, the snippets comprise tube segments with slits that enable the tube segments to be fit over the bottom portions of the rafters and to slide along the bottom portions of the rafters to selected locations along the rafters. Also, the tube is preferably formed of a material that is a good heat absorber when exposed to sunlight, so the tube structure is particularly useful in a solar heating system where the coiled tube would be applied to the roof of a building.

The improved method of the present invention assembles a tube structure that can be applied to a substrate. The method comprises (a) providing a tube in a predetermined configuration, (b) providing at least one rafter at a predetermined location relative to the tube, the rafter engaging the tube in a manner designed to hold the tube in predetermined configuration, and (e) providing a plurality of snippets at predetermined locations on the rafter, the snippets configured to (i) hold the rafter and tube away from the substrate surface, and (ii) allow relative movement of the rafter and/or tube relative to the snippets during expansion and contraction of the tube and/or rafter due to temperature variations to which the tube structure is subjected, and (d) assembling the tube with the rafters and assembling the snippets with the rafters to provide a tube structure in a condition to be applied to a substrate.

The assembling of the snippets with the rafters comprises fitting one or more of the snippets over the bottom portions of selected rafters and sliding the snippets to selected locations along the bottom portions of the rafters.

The invention is particularly useful as a tube structure for a solar heating unit where the tube is in a coiled configuration when applied to the roof of a building, and the tube absorbs heat when exposed to sunlight, to heat water that is being circulated through the tube.

Further features of the present invention will be apparent from the following detailed description and the accompanying drawings.

DETAILED DESCRIPTION

As described above, the present invention provides a method and assembly designed to improve a known way of supporting a tube structure on a substrate (e.g. a building roof), in a manner that promotes flow of water and debris along the substrate, while compensating for expansion and contraction of the tube and rafter due to temperature variations to which those components are subjected.

The principles of the present invention are described herein in connection with a solar heating assembly where a coiled tube structure is assembled for application to a building roof, but from that description, the manner in which the principles of the present invention can be used with various types of tube structures, in various configurations, for application to various substrates will he apparent to those in the art.

Figure 1:
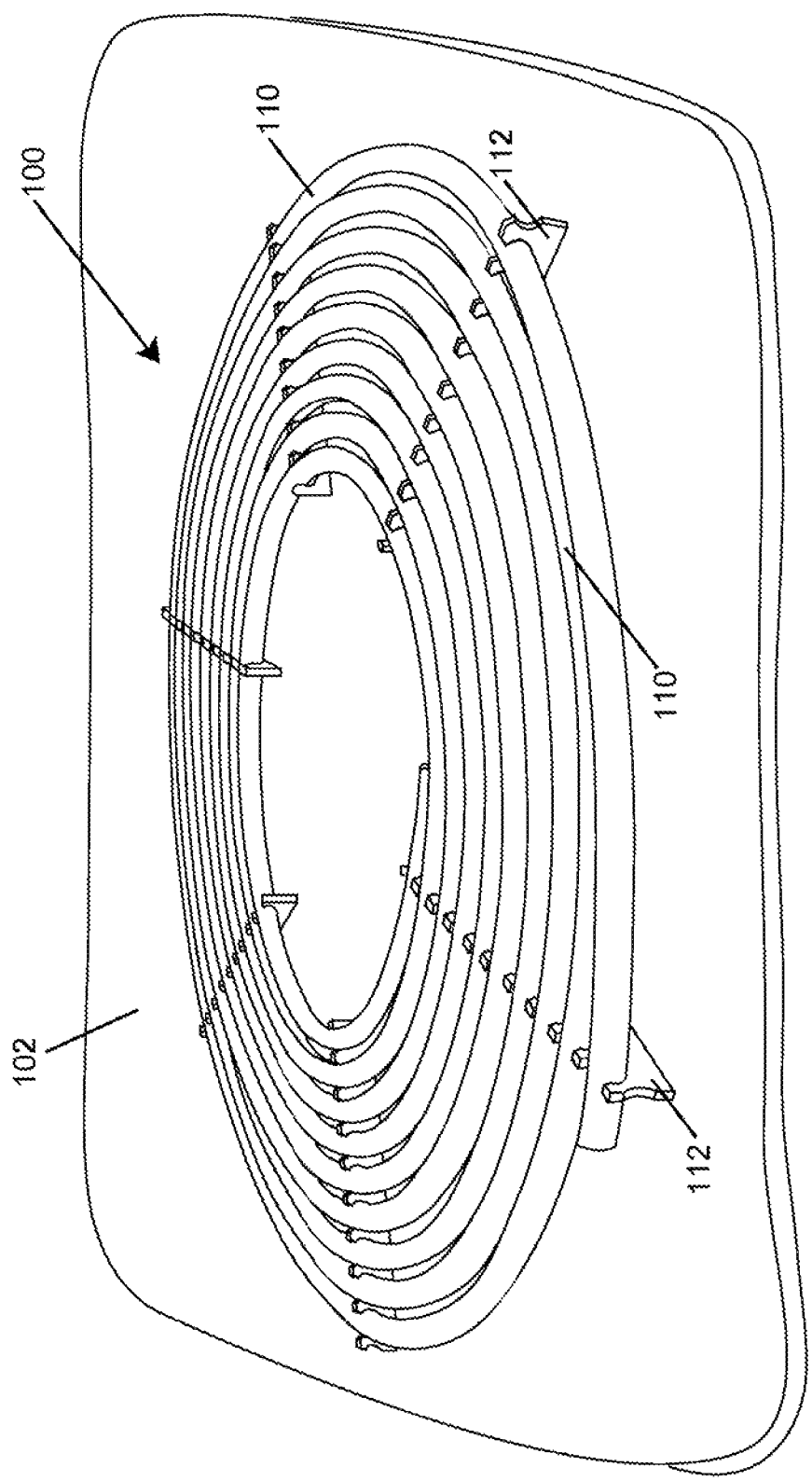
FIG. 1 is a schematic illustration of the manner in which solar heating tube(s) and rafters would be configured for application to a substrate such as a building roof.
Figure 2:
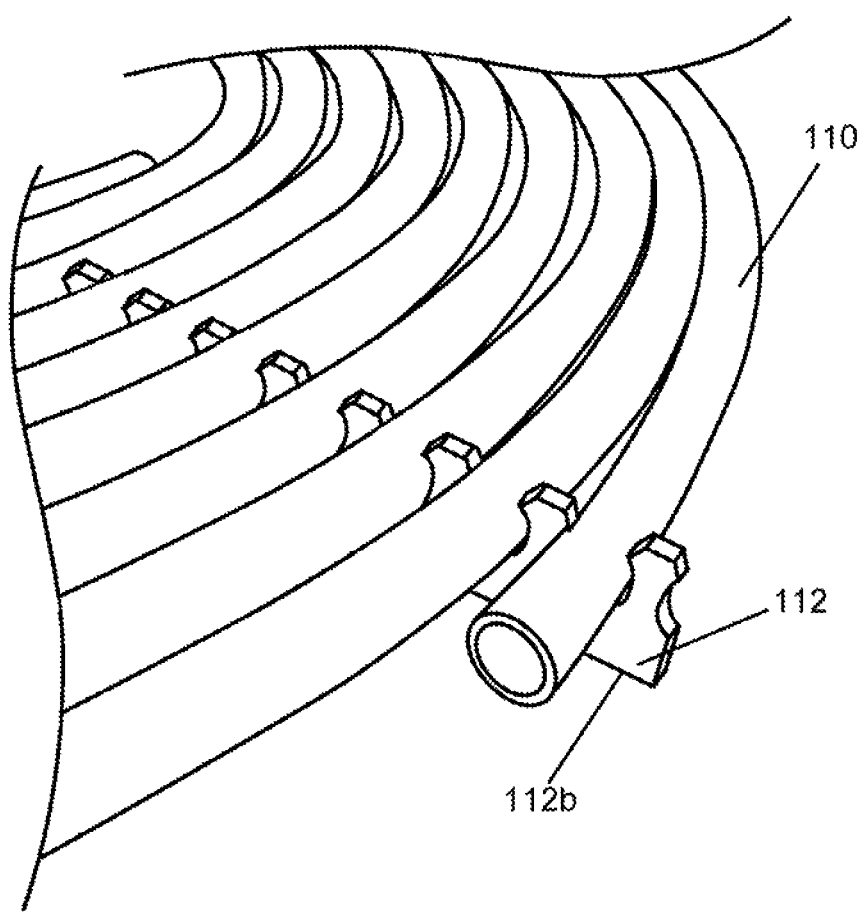
FIG. 2 is an enlarged, fragmentary illustrations of the tube (s) and rafter(s) of FIG. 1.
Figure 3:
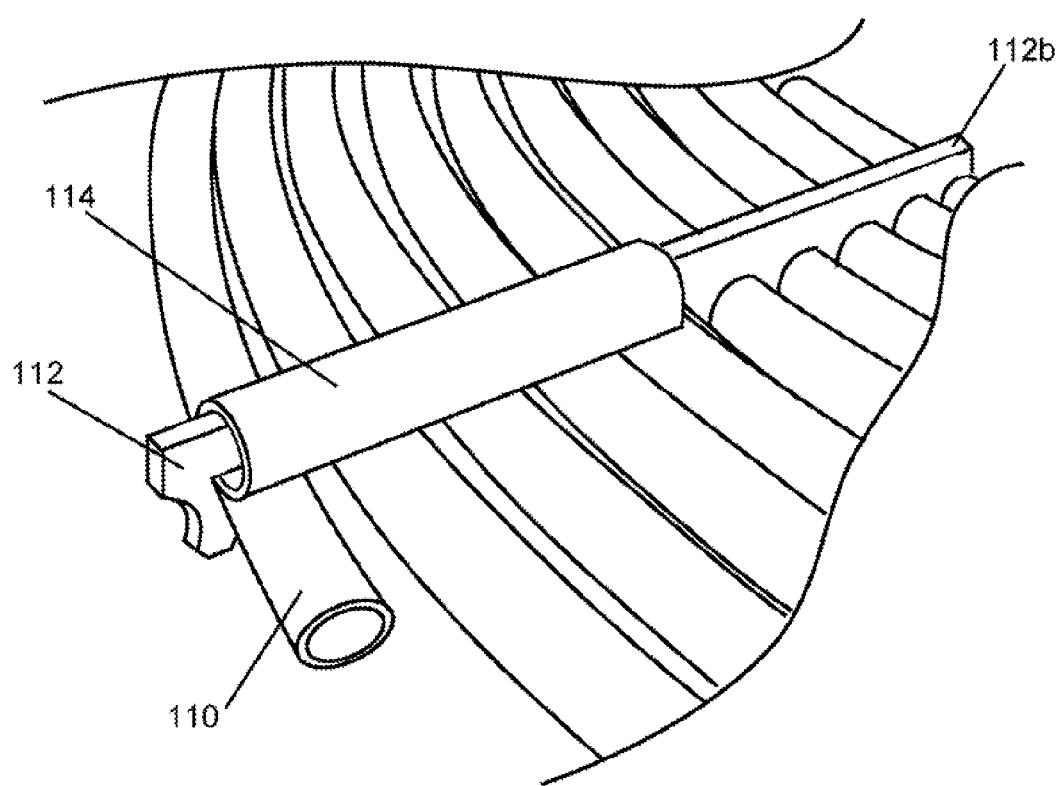
FIG. 3 is a fragmentary illustration of the tube(s) and rafter(s) of FIG. 1, in an inverted orientation, and showing a snippet coupled with the rafter, in accordance with the principles of the present invention.
Figure 4:
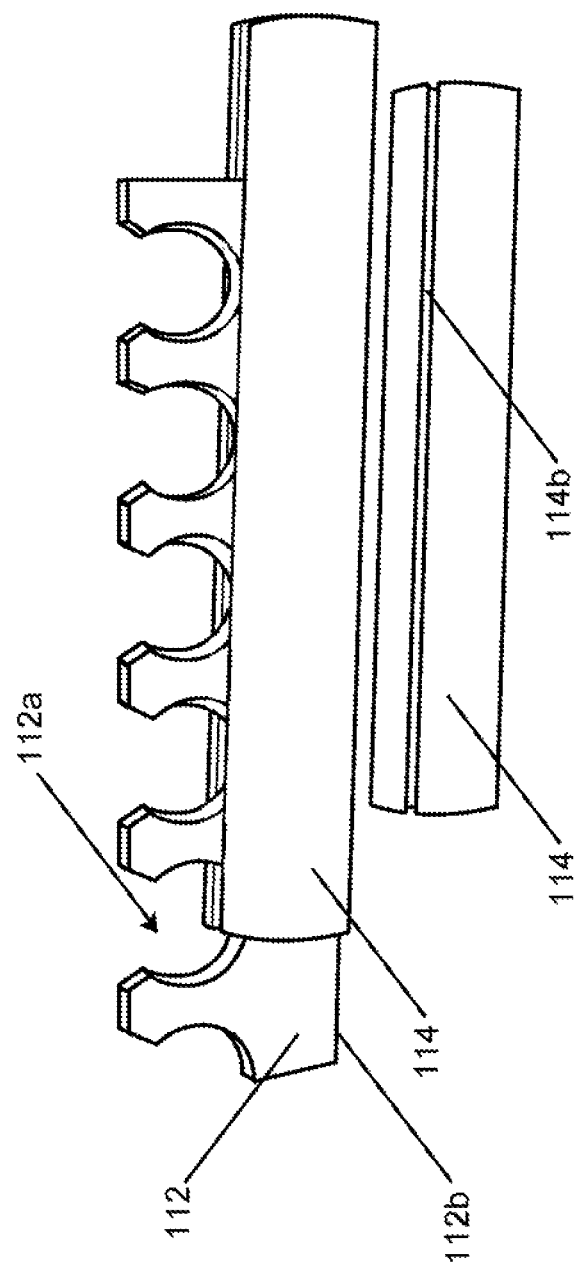
FIG. 4 is a schematic illustration of a rafter and snippet coupled together, and an additional snippet, in accordance with the principles of the present invention.
Figure 5:
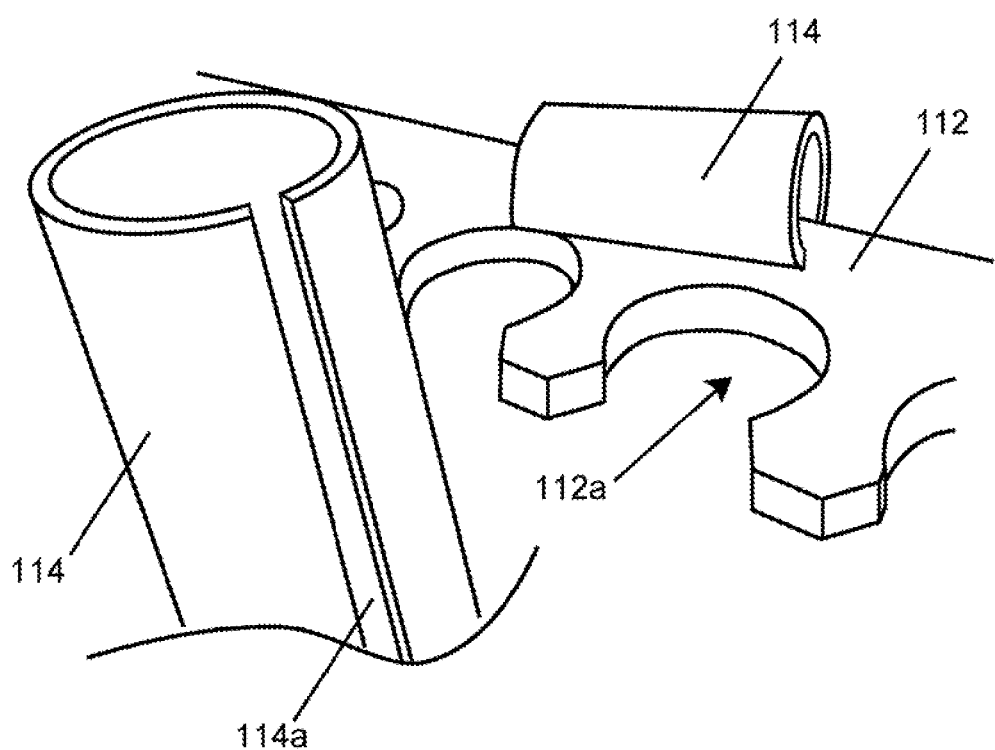
FIG. 5 is a schematic illustration of rafters and snippets, some of which are coupled together, in accordance with the principles of the present invention.
Figure 6:
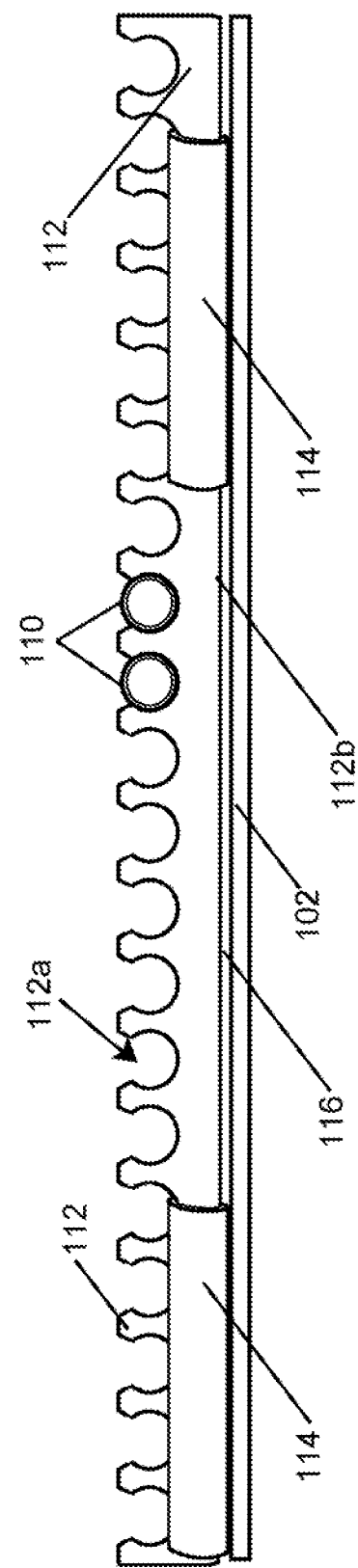
FIG. 6 is a schematic fragmentary illustration. of the manner in which solar heating tube(s) and rafter(s) are supported on a substrate (e.s. a roof surface) by snippets, in accordance with the principles of the present invention.

In FIGS. 1 and 6, a substrate is identified at 102, and is intended to simulate the surface of a roof, for purposes of this description.

FIG. 1 is a schematic illustration of the manner in which. a solar heating tube 110 would be provided and maintained in a predetermined coiled configuration 100 for application to a substrate 102 such as a building roof, in accordance with the principles of the present invention. The heating tube 110 is held in a coil (substantially circular) configuration by a series of radially oriented rafters 112 that are essentially braces or brackets that hold the tube 110 in the coil configuration. The rafters 112 have U shaped upper portions 112a into which the tube 110 is inserted and which hold the tube in the coil configuration 110. The rafters 112 have bottom surfaces 112b that would normally lie against the roof surface 102, and would therefore hold the coil 100 above the roof surface.

According to the present invention, a plurality of snippets 114 are connected to selected locations on the rafters 112. The snippets 114 are tubular segments with slots 114a that enable the snippets to fit over the bottoms of the rafters and slide along the rafters to locations that are selected as best for the particular solar heating assembly being configured. Those locations would place a pair of snippets 114 in spaced relation to each other along the surface 102 of a roof, as schematically illustrated in FIG. 6. Moreover, the snippets 114 would support the rafters 112 spaced above the roof surface 112, with a gap 116 that extends between the snippets 114 and between the rafter(s) and the roof surface 102. Thus, when the snippets 114 are assembled with the tube coil/rafter assembly as shown in FIG. 1, the snippets 114 hold the rafter(s) 112 and the tube(s) in the coil 100 above the roof surface, with gaps similar to gap 116 (FIG. 6) extending between the snippets 114 and between the roof surface 102 and the rafter(s) and tubes. Therefore, water and debris can flow through those gaps 116, and therefore the risk of the water/debris collecting on the roof surface is reduced.

The tube(s) are preferably made of vacuum extruded polyethylene, which can be effectively extruded to the tube configurations, is a good absorber of heat, and will maintain the tube configuration for a considerable time. The snippets 114 are currently formed as cut portions of tubes, from the same vacuum extruded polyethylene, and have the slots 114a cut or otherwise formed therein. The rafters 112 are currently formed of polyethylene that is formed in the rafter configuration shown.

Because the polyethylene that forms the tube(s), the rafter (s) and the snippets 114 is a good absorber of heat, and is used to transfer heat to water circulating through the tube(s), there may be significant expansion and contraction of the tube(s) rafter(s) and snippets due to temperature variations in the environment in which those components operate during a solar heating/cooling cycle. The manner in which the snippets connect to the rafters, e.g. the slits 114a in the snippets enable the snippets 114 to slide along the rafters to selected locations on the rafters enables the rafters to move relative to the snippets during expansion and contraction during a solar heating/cooling cycle. Thus, the manner in which the snippets connect to the rafters, and support the rafters and tubes above the roof surface 102, enables relative movement of the rafters and tubes relative to the snippets during solar heating/cooling cycles, while maintaining the gaps 116 that allow flow of water and debris through those gaps, and minimizes risk of collection of water and debris on the roof of a building structure.

While the principles of the present invention have been described herein in connection with a solar heating coil structure 110 for a building roof, those in the art will recognize that the principles of the present invention can be applied to solar heating tube(s) and rafter(s) or brackets, in various shapes and configurations, that are supported on various types of substrates.

The invention claimed is:

1. A tube structure for application to a substrate, comprising
   a. a tube in a predetermined configuration,
   b. at least one rafter at a predetermined location relative to the tube, the rafter engaging the tube in a manner designed to hold the tube in the predetermined configuration, the rafter having upper portions that engage the tube and bottom portions that are configured to face the surface of a substrate to which the tube is applied, and
   c. a plurality of snippets connected at predetermined locations to the rafter, the snippets extending away from the bottom surface of the rafter, and configured to
      i. hold the rafter away from the substrate surface in a manner that allows flow of water and debris along the substrate without interference from the rafter, and
      ii. allow relative movement of the rafter and tube relative to the snippets during expansion and contraction of the tube and rafters due to temperature variations to which the tube structure is subjected.

2. The tube structure of claim 1, wherein the snippets comprise tube segments with slits that enable the tube segments to be fit over the bottom portions of the rafters and to slide along the bottom portions of the rafters to selected locations along the rafters.

3. The tube structure of claim 2, wherein the tube is in a predetermined coiled configuration.

4. The tube structure of claim 3, wherein the step of providing the tube comprises providing a tube formed of a material that is a good absorber of heat when exposed to sunlight, such that the tube in the predetermined coiled configuration is useful in a solar heating system.

* * * * *